United States Patent
Kulis, Jr. et al.

(10) Patent No.: US 7,320,386 B2
(45) Date of Patent: Jan. 22, 2008

(54) HIGH FRICTION BRAKE SHOE ASSEMBLY

(75) Inventors: Stanley F. Kulis, Jr., Cookeville, TN (US); Craig R. Cook, Winchester, VA (US); David D. Muffley, Clear Spring, MD (US)

(73) Assignee: Federal Mogul World Wide, Inc., Southfield, MI (US)

(*) Notice: Subject to any disclaimer, the term of this patent is extended or adjusted under 35 U.S.C. 154(b) by 0 days.

(21) Appl. No.: 11/037,721

(22) Filed: Jan. 18, 2005

(65) Prior Publication Data

US 2005/0139439 A1 Jun. 30, 2005

Related U.S. Application Data

(63) Continuation-in-part of application No. 10/336,080, filed on Jan. 3, 2003, now Pat. No. 6,860,368.

(51) Int. Cl.
*F16D 69/00* (2006.01)
*F16D 65/04* (2006.01)

(52) U.S. Cl. ............... 188/250 B; 188/250 G

(58) Field of Classification Search ........... 188/234, 188/247, 250 G, 250 B; 433/169, 172, 173, 433/174, 177
See application file for complete search history.

(56) References Cited

U.S. PATENT DOCUMENTS

| | | | |
|---|---|---|---|
| 1,202,529 A | 10/1916 | Jones | |
| 1,336,752 A | 4/1920 | Muller | |
| 1,532,141 A | 4/1925 | Kenyon | |
| 1,592,273 A | 7/1926 | Kelly | |
| 1,781,074 A | 11/1930 | Norton | |
| 1,880,750 A | 10/1932 | Brackett | |
| 2,218,680 A * | 10/1940 | Kempel | 188/234 |
| 2,879,866 A | 3/1959 | Newell | |
| 3,473,631 A * | 10/1969 | Schmid | 188/71.1 |
| 3,941,222 A | 3/1976 | Newstead | |
| 3,986,585 A * | 10/1976 | Toplis et al. | 188/73.1 |
| 4,473,140 A * | 9/1984 | Komori | 188/250 G |
| 4,569,424 A | 2/1986 | Taylor, Jr. | 188/250 G |
| 4,799,579 A | 1/1989 | Myers et al. | 192/107 M |
| 4,924,583 A | 5/1990 | Hummel et al. | 29/460 |
| 4,991,697 A | 2/1991 | Hummel et al. | 188/250 B |
| 5,141,083 A | 8/1992 | Burgoon | 188/73.1 |
| 5,355,986 A | 10/1994 | Biswas | 192/107 R |
| 5,695,026 A | 12/1997 | Redgrave et al. | 188/250 D |

(Continued)

FOREIGN PATENT DOCUMENTS

RU 21185 U1 12/2001

(Continued)

*Primary Examiner*—Melody M. Burch
(74) *Attorney, Agent, or Firm*—Dickinson Wright PLLC; Edmund P. Anderson

(57) ABSTRACT

A vehicle brake shoe assembly (10) having a rigid backing plate (12) incorporating a plurality of extensions (100) which project through the brake friction material matrix (22) to the outer friction surface (24) of the brake shoe assembly (10). Each extension (100) is configured to cooperate with the brake friction material matrix (22) to engage a surface of an opposing friction element (28) simultaneously with the friction material (22), increasing the static and dynamic friction performance of the assembly (10) during initial use beyond that achieved from the application of either the brake friction material (22) or the projections (100) alone.

3 Claims, 5 Drawing Sheets

U.S. PATENT DOCUMENTS

| | | | |
|---|---|---|---|
| 5,732,800 A | 3/1998 | Spigener | 188/234 |
| 6,109,399 A * | 8/2000 | Crawford et al. | 188/250 B |
| 6,167,992 B1 * | 1/2001 | Torpey et al. | 188/73.1 |
| 6,241,058 B1 * | 6/2001 | Shute et al. | 188/250 B |
| 6,279,222 B1 * | 8/2001 | Bunker et al. | 29/527.5 |
| 6,367,600 B1 | 4/2002 | Arbesman | 188/250 G |
| 6,464,047 B1 | 10/2002 | Arbesman | |
| 2001/0045330 A1 * | 11/2001 | Chiang et al. | 188/24.12 |

FOREIGN PATENT DOCUMENTS

| | | |
|---|---|---|
| SU | 579943 | 11/1977 |
| SU | 1780527 A3 | 12/1992 |

* cited by examiner

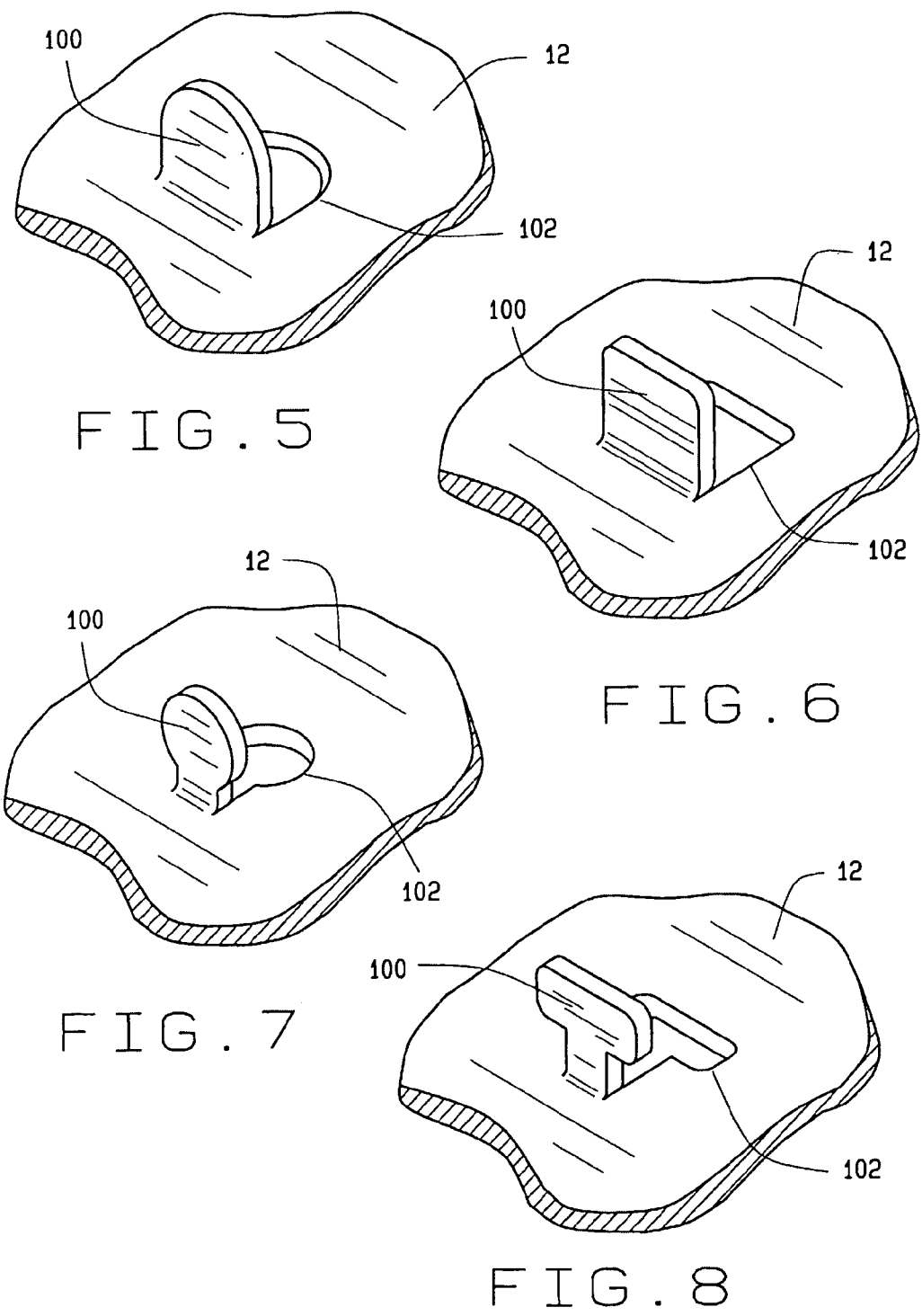

HIGH FRICTION BRAKE SHOE ASSEMBLY

CROSS-REFERENCE TO RELATED APPLICATIONS

This is a Continuation-In-Part of U.S. Ser. No. 10/336,080, filed Jan. 3, 2002, now U.S. Pat. No. 6,860,368.

BACKGROUND OF THE INVENTION

The present invention relates generally to vehicle brake assemblies, and in particular, to a high friction brake assembly incorporating a plurality of backing plate extensions through a friction material matrix, to be utilized in vehicle parking brakes and vehicle emergency braking systems on vehicle equipped with a separate typical, full service brake system (disc or drum) at each of its four wheels.

Vehicle drum type friction brakes commonly include a vehicle brake shoe assembly carrying a frictional matrix which is brought into contact with an inner cylindrical surface of a rotating brake drum to generate a frictional force and correspondingly slow, stop, or hold the vehicle in a stationary or parked position. Disc brake systems include a caliper assembly having opposing friction pads which are brought into contact with a rotor disc.

Variations between the friction surface of the brake assembly and the surface of the rotating brake member (drum or disc) can alter the frictional effectiveness of a friction brake during its initial instances of use. For example, if the friction level generated by a friction brake is too low due to regions of the frictional matrix which are not in contact with the opposing friction surface of the brake drum or rotor, the brake will not function to the required level of static effectiveness, i.e. parking brake capability. One method commonly utilized to overcome this type of static friction problem is to bring the vehicle to a stop a number of times using only the parking brake or emergency brake, thereby generating excessive frictional forces on those portions of the brake assembly in contact with the rotating brake drum or rotor, and wearing or abrading them into closer conformance with the surface of the rotating brake drum or rotor. Such methods are prone to neglect by the average operator. If performed in an improper manner, these methods can lead to premature failure or excessive wear on the brake components.

Alternatively, frictional braking forces can be increased in vehicle friction brakes by producing a rough or sandblasted friction surface on the brake drum or rotor which is engaged by the brake shoe or pad assembly. This process, while increasing the frictional braking forces in the initial periods, may accelerate attrition of the friction material, shortening the lifespan of the brake components such as the brake friction material matrix.

The use of backing plate extensions, nubs or teeth, which are completely contained within, and engage with, the brake friction material matrix on brake shoe and pad assemblies, has been previously employed to facilitate the attachment and interlocking of the brake friction material matrix to the backing plate. See, for example, U.S. Pat. No. 6,367,600 B1 to Arbesman and U.S. Pat. No. 6,279,222 B1.

Another example of the use of projecting nubs or teeth is seen in U.S. Pat. No. 4,569,424 to Taylor, Jr., where a brake shoe assembly is provided. A friction material matrix in the '424 Taylor, Jr. reference is molded directly onto a brake liner plate which includes a plurality of perforations forming protruding tabs. The inter-engagement between the molded friction material and the perforated areas and tabs provides an enhanced interlocking strength between these elements. The '424 Taylor, Jr. reference, specifically teaches that it is undesirable for the protruding tabs to extend so far as to reach the outer surface of the friction material matrix, and indicate that the brake shoe assembly has reached the end of a useful service life when sufficient friction matrix material has been worn away so as to expose the protruding tabs.

Accordingly, there is a need in the automotive brake systems design area for a parking brake or emergency brake assembly with enhanced static and dynamic frictional properties, and which does not require an initial wear or break-in period to improve conformance between the frictional matrix and the opposing frictional surface of the brake drum or rotor.

BRIEF SUMMARY OF THE INVENTION

The invention relates to an emergency brake assembly comprising a rotating member operatively associated with a vehicular wheel. The rotating member (e.g., a wheel drum or rotor) has an engagement surface which forms the braking surface. A non-rotating brake element (e.g., either a brake shoe or pad) is positioned adjacent the rotating member and is movable between a brake applied condition in pressing contact with the engagement surface and a brake relaxed condition spaced from the engagement surface. The brake element includes a rigid backing plate and a friction material disposed on the backing plate. The friction material defines an outer surface opposing the engagement surface of the rotating member and engagable therewith in the brake applied condition. A plurality of extensions project from the backing plate through the friction material. Each of the extensions terminates in a tip proximate the outer surface of the friction material. The tips and the outer surface of the friction material are arranged in relation to the compressibility of the friction material so that they simultaneously contact the engagement surface of the rotating member (drum or rotor disc) when the brake element is moved to its brake applied condition. In this manner, both the friction material and the projections contribute to the generation of friction against the rotating member thereby enhancing the braking effectiveness of the assembly.

The subject invention overcomes the prior art problems of an emergency brake assembly which does not require an initial wear or break-in period to achieve optimal friction characteristics by assuring that both the friction material and the projections contribute to the friction mechanism when the brake assembly is placed in its brake applied condition. The projections have the ability to roughen the engagement surface (of the rotating drum or rotor disc) while the friction material forms itself to an optimal shape, thus achieving a high coefficient of friction very quickly. Thus, the emergency brake may achieve optimal friction generation even during initial use and without a break-in period.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 5 is an enlarged view of a second alternate configuration of a projection formed in the brake shoe platform;

FIG. 6 is an enlarged view of a third alternate configuration of a projection formed in the brake shoe platform;

FIG. 7 is an enlarged view of a fourth alternate configuration of a projection formed in the brake shoe platform;

FIG. 8 is an enlarged view of a fifth alternate configuration of a projection formed in the brake shoe platform;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
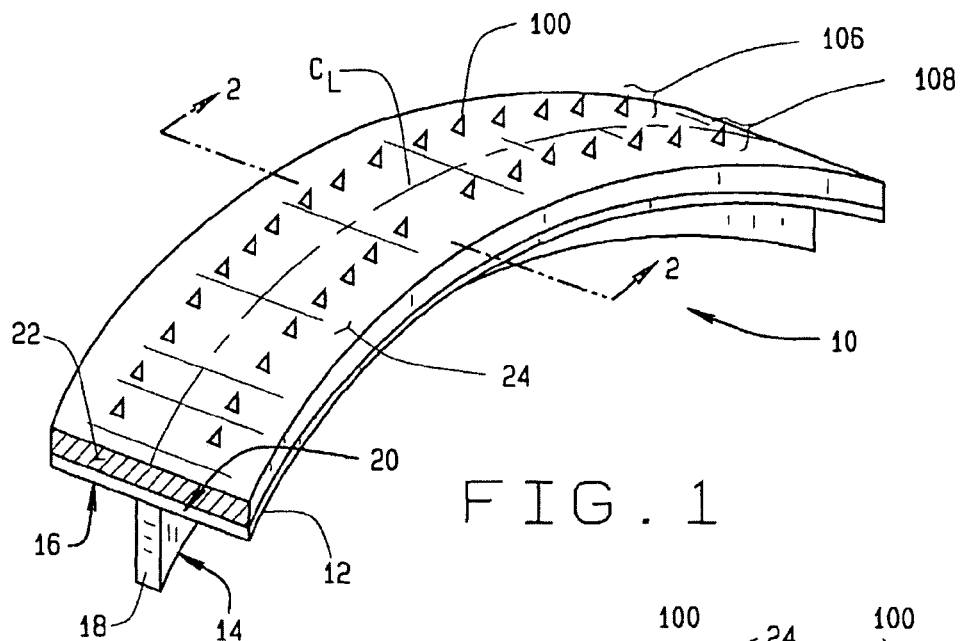
FIG. 1 is a perspective view of a brake shoe assembly of the present invention.

Turning to FIG. 1 a brake shoe assembly of the present invention is shown generally at 10. The brake shoe assembly 10 comprises a cylindrically curved brake shoe platform 12 defining a portion of a cylinder surface. The brake shoe assembly 10 is configured with one or more attachment points 14 on a lower surface 16 adapted to facilitate attachment of the brake shoe assembly 10 to a supporting structure on a motor vehicle wheel (not shown). The specific features of the attachment points 14 vary depending upon the particular application for which the brake shoe assembly 10 is intended.

For example, the attachment points 14 may consist of a raised web 18 extending circumferentially along the lower surface 16, one or more protruding threaded bosses (not shown), or bores (not shown) through which retaining pins are placed. The brake shoe platform 12 further includes an upper surface 20 configured to receive a brake friction material matrix 22. The radially outermost surface of the brake friction material matrix 22 defines an outer friction surface 24.

Figure 2:
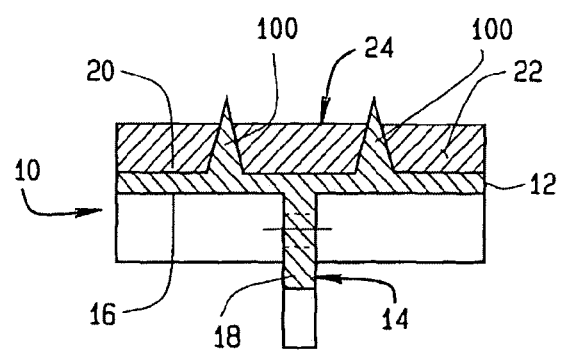
FIG. 2 is a sectional view of the brake show assembly of FIG. 1, taken at line 2-2.

As can be seen in FIGS. 1 and 2, a plurality of extensions 100 project radially outward from the upper surface 20 of the brake shoe platform 12. Each of the plurality of extensions 100 passes through the brake friction material matrix 22, and terminates in a first embodiment at the outer friction surface 24. In an alternate embodiment, each of the plurality of extensions 100 terminates radially outward from the outer friction surface 24, exposing a protruding portion.

Figure 3:
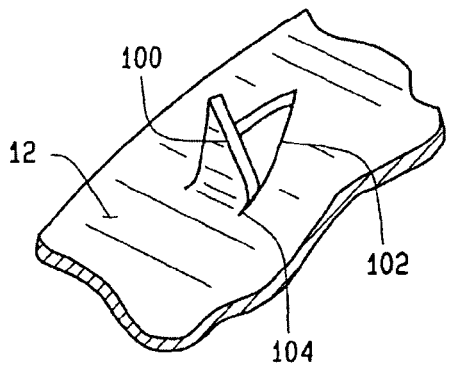
FIG. 3 is an enlarged view of a projection of the present invention formed in the brake shoe platform.
Figure 4:
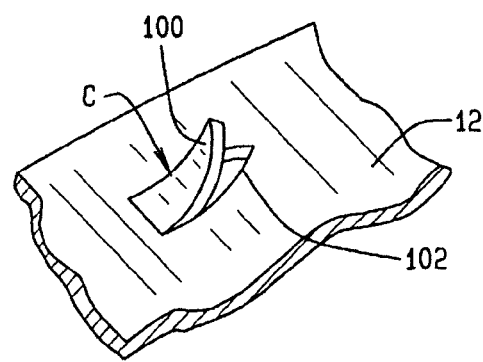
FIG. 4 is an enlarged view of a first alternate projection of the present invention formed in the brake shoe platform.

Preferably, as shown in FIG. 3, each projecting extension 100 is integrally formed as a punch-out from the brake shoe platform 12. Each integral projecting extension may be formed by cutting the brake shoe platform 12 along a segment 102 in a manner such that no material is separated from the brake shoe platform, with the ends of each segment 102 aligned parallel to an axis of the cylinder defined by the curvature of the brake shoe platform. Each projecting extension 100 is formed by bending the material within the cut radially outward to a desired angular orientation from the outer surface of the brake shoe platform, along a bending axis 104 between each end of segment 102. Alternatively, each projecting extension 100 may be formed by bending the material of the brake shoe platform defining the extension 100 in a smooth curve C, as seen in FIG. 4, rather than bending only along a bending axis 104 between the ends of segment 102.

Those of ordinary skill in the art will readily recognize that a variety of methods may be employed to form and secure the projecting extensions 100 to the brake shoe platform 12, to achieve the desired result of the projecting extensions passing radially outward through the friction material matrix 22. For example, individual extensions 100 could be manufactured separate from the brake shoe platform 12, and welded or secured to the brake shoe platform.

Those of ordinary skill in the art will further recognize that the projecting extensions 100 need not be limited to the triangular configuration shown in FIGS. 1-4. For example, as shown in FIG. 5 through FIG. 8, exemplary alternative configurations such as rounded tabs, rectangles, keyholes, and T-shapes may be utilized for projecting extensions 100.

Preferably, as seen in FIG. 1 the projecting extensions 100 are arranged in two parallel circumferential rows 106, 108 on either side of a circumferential centerline $C_L$ of the cylindrically curved brake shoe platform 12.

Figure 9:
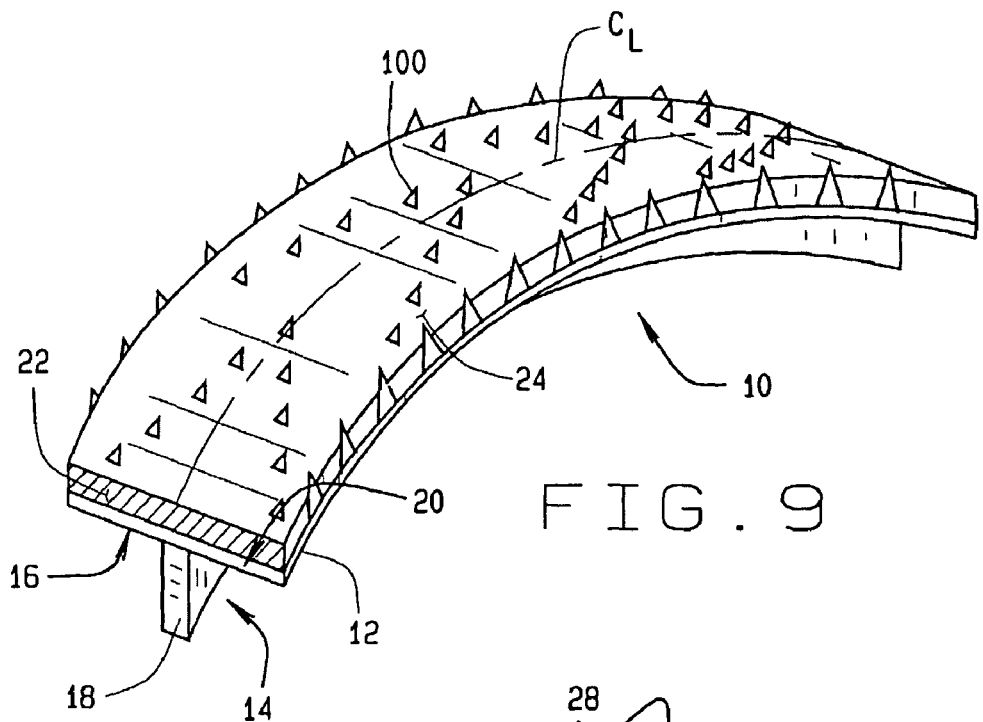
FIG. 9 is a perspective view of a brake shoe assembly of an alternate configuration of the present invention.

In a first alternative configuration, the projecting extensions 100 may be symmetrically disposed about the circumferential centerline $C_L$ of the cylindrically curved brake shoe platform 12. For example, as seen in FIG. 9, the projecting extensions 100 may define one or more "V" patterns on the upper surface 20 of the brake shoe platform 12. If only one "V" pattern is defined by the projecting extensions 100, each projecting extension 100 may be disposed within a unique circumferential arc on the upper surface 20 of the brake shoe platform 12. Also shown in FIG. 9, the projecting extensions 100 may be disposed on the upper surface 20 such that they are on the outer edges of the brake shoe platform 12.

In a second alternative configuration, the projecting extensions 100 may be randomly disposed on of the cylindrically curved brake shoe platform 12.

Figure 10:
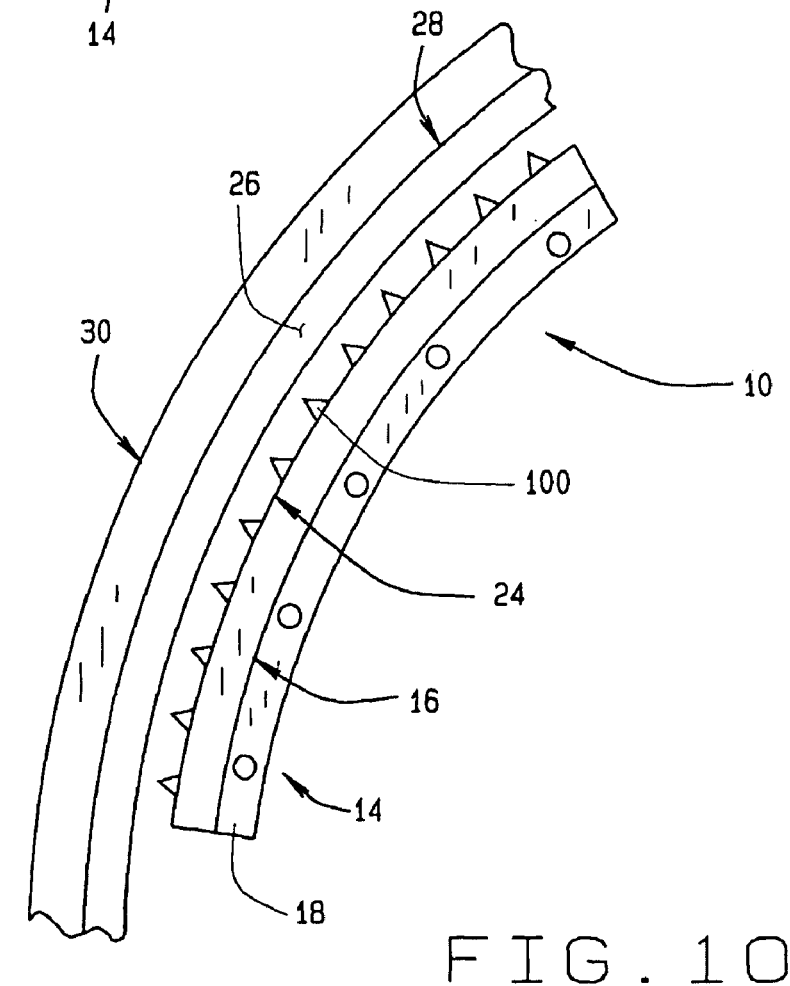
FIG. 10 is a side view of a brake shoe assembly of the present invention in operative relationship to a brake drum surface.

As seen in FIG. 10, during operating of a vehicle braking system, the brake shoe assembly 10 is actuated in a conventional manner to move the outer friction surface 24 and projecting extensions 100 into contact with an opposing friction surface 26, if present on an inner cylindrical surface 28 of a co-axially mounted brake drum 30, or directly against the inner cylindrical surface 28. Operation of the vehicle braking system when the vehicle is stationary, i.e. application of the parking brake, results in the outer friction surface 24 and projecting extensions 100 being moved into stationary contact with the opposing friction surface 26. This results in an initial static friction (green friction) force which must be overcome before the brake drum 30, and opposing friction surface 26, can rotate relative to the brake shoe assembly 10 and outer friction surface 24.

Operation of the vehicle braking system when the vehicle is in motion, i.e. application of an emergency brake, results in the outer friction surface 24 and projecting extensions 100 being moved into rotational or sliding contact with the opposing friction surface 26. This results in a dynamic frictional force at the contacting friction surfaces and projecting extensions 100, acting to reduce the relative rotation between the brake drum 30 and the brake shoe assembly 10.

According to another aspect, the invention can be used with particular effectiveness to counteract the problem of emergency brakes not adequately generating enough friction due to their infrequency of use. In particular, when a brake element is newly installed, its fit relative to the rotating member 30, i.e., the brake drum or brake rotor, is poor which results in a lower than calculated coefficient of friction. In a vehicle's normal braking system arranged about the four wheels, this is not an issue because the surfaces will quickly wear into each other after only the first few stops. However, emergency and parking brakes do not enjoy the benefit of running in periods to establish a "healthy" wear surface. They are often outfitted only on a single wheel, usually a rear wheel, and may never be deployed except in a true emergency situation when optimal performance is most needed. Even in routine parking conditions, the emergency brake may not have the holding power necessary to maintain the vehicle in a stationary condition on steep inclines, particularly in new vehicles when the emergency brake has not seen much use.

Figure 11A:
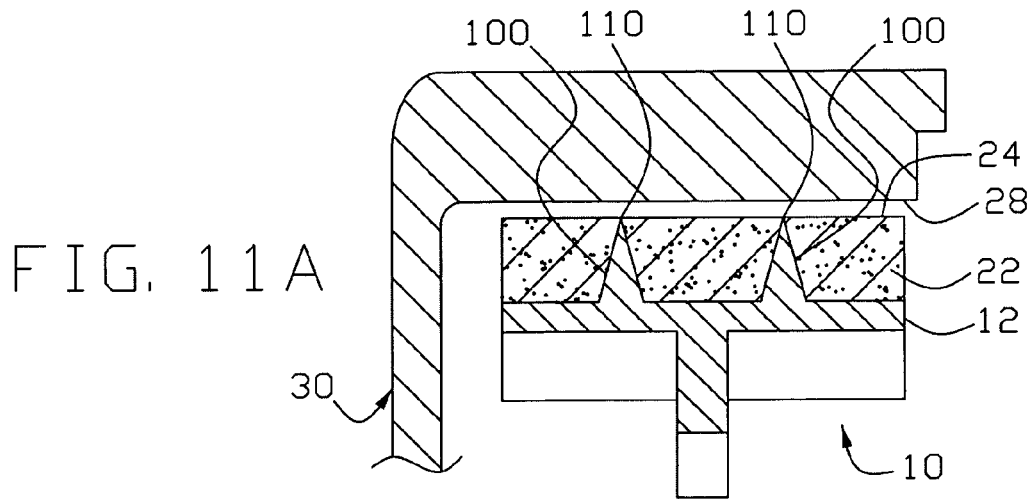
FIGS. 11-A through 11-C illustrate a sequence of braking conditions wherein FIG. 11-A shows a brake relaxed condition, FIG. 11-B shows the brake applied in a normal parking condition, and FIG. 11-C represents the brake applied in a high load force application such as might occur in a panic stop.
Figure 11B:
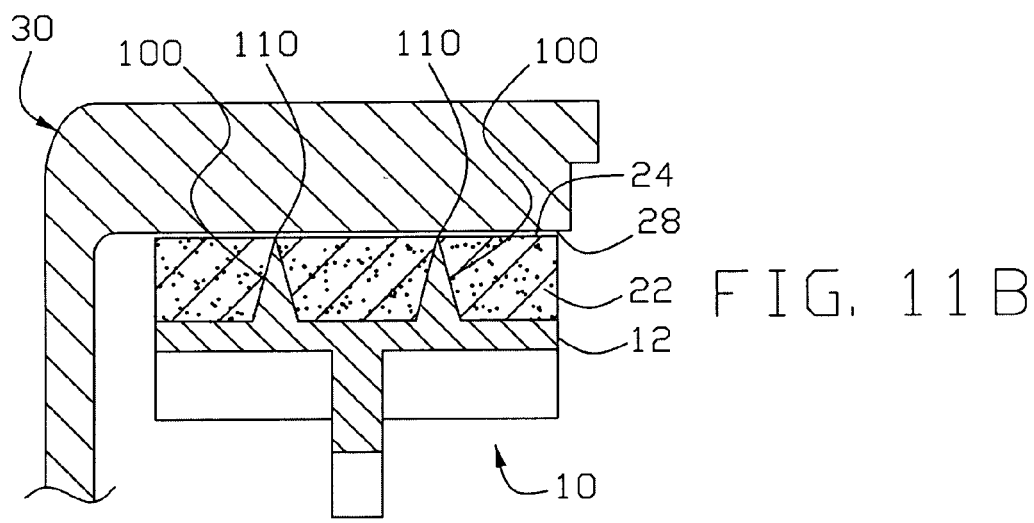
Figure 11C:
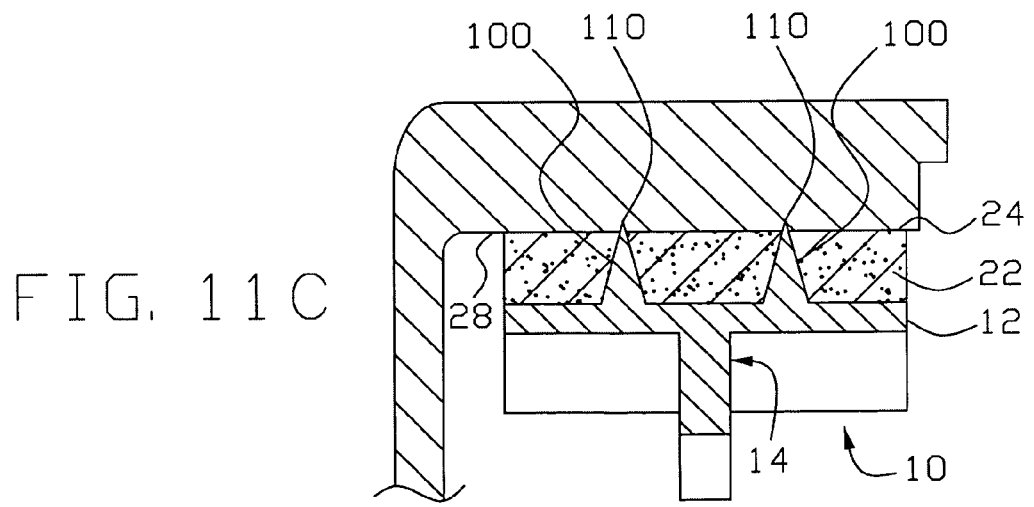
Figure 12:
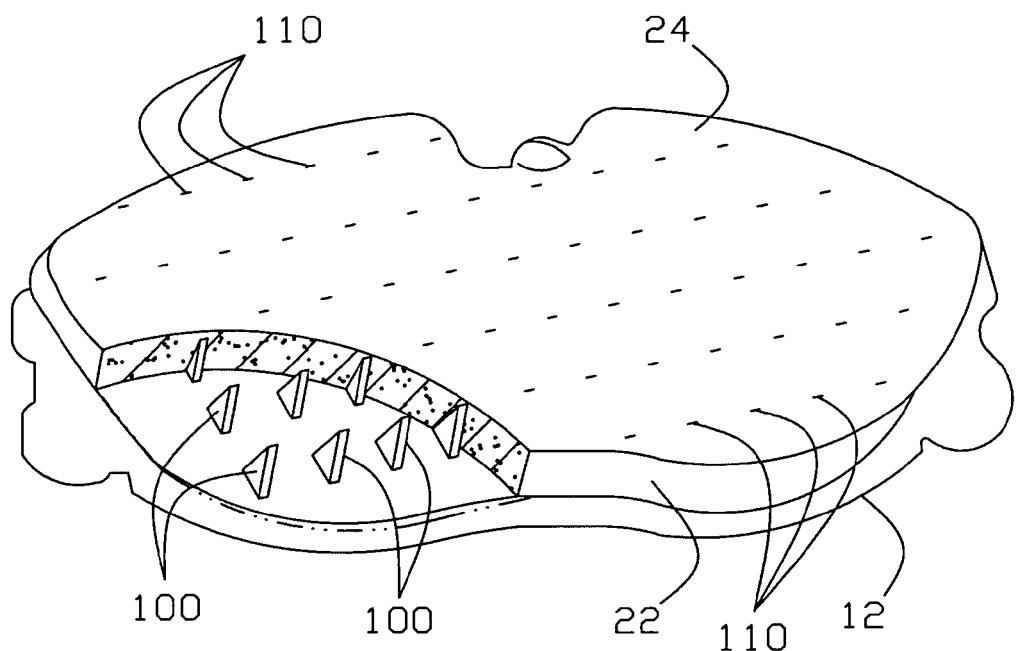
FIG. 12 is a perspective view of a disc brake pad according to the invention with the friction material partially cut away to expose the embedded projections.
Figure 13:
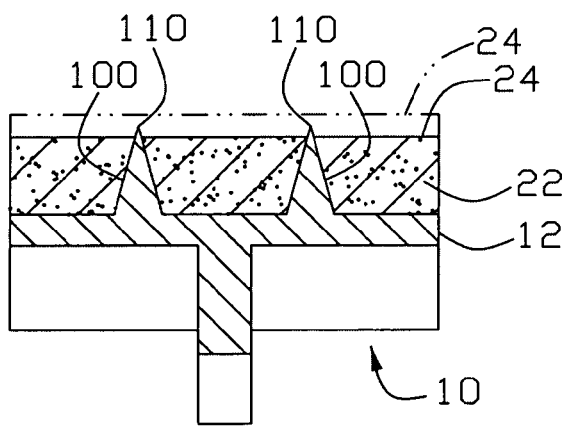
FIG. 13 is a sectional view as in FIG. 2 but showing an alternative embodiment of the invention wherein the projections are recessed below the running surface of the friction material, as shown in phantom, but upon the application of sufficient pressure, the friction material compresses to the position shown in solid lines and thus exposes the projections.

FIGS. 11-13 illustrate an alternative embodiment of the invention, wherein the projections 100 do not stand proud of the outer friction surface 24 in a brake relaxed condition. Rather, the projections 100 are set with their tips 110 terminating in the plane of (i.e., even or flush with) the outer friction surface 24. In this manner, the tips 110 of the projections 100 will be just barely visible, as small metallic spots, in the outer friction surface 24. FIG. 11-A represents the brake shoe assembly 10, relative to the brake drum 30, in the brake relaxed, or brake off, condition. This is the normal condition for an emergency brake system, and in which the emergency brake remains during normal vehicle travel. For all practical purposes, there is no contact pressure applied to the brake drum 30 by the brake shoe assembly 10 in the brake relaxed condition.

In FIG. 11-B, the brake shoe assembly 10 is shown in a normal brake applied condition. In this situation, the emergency brake has been applied with only moderate pressure being exerted by the brake shoe assembly 10 against the brake drum 30. This condition most frequently represents the application of the parking brake to supplement the vehicle transmission and maintain the vehicle in a safe, stationary condition while unattended. FIG. 11-C represents a high load force application such as might occur in a panic stop condition or when an operator applies unusually excessive force to the emergency brake actuator. In this condition, the relatively more compressible friction material 22 can actually recede far enough to expose the tips 110 above the outer friction surface 24, thus driving the tips 110 into biting engagement with the engagement surface 28 of the rotating drum member 30.

The tips 110 and the outer surface 24 of the friction material 22 are arranged in relation to the compressibility of the friction material 22 such that the tips 110 and the outer surface 24 simultaneously contact the engagement surface 28 of the rotating drum member 30 when the brake element 10 is moved to the brake applied condition (FIGS. 11-B and 11-C) so that both the friction material 22 and the projections 100 contribute to the generation of friction against the rotating drum member 30 thereby enhancing the braking effectiveness of the assembly. Whereas prior art arrangements may have relied solely on the friction material to generate friction, the subject invention utilizes both its friction material 22 and its projections 100 which, in the case of an imperfectly conforming outer surface 24, combine to overcome surface irregularities and establish optimal holding power even in new, unused emergency braking systems. This combined friction generating mechanism is also helpful to overcome an improperly set parking brake in which the brake actuator is set too lightly by the operator. In this situation caused by operator error, the added friction generating capabilities of the combined friction material 22 and projections 100 may be sufficient to prevent a parked vehicle from rolling away.

FIG. 12 is a perspective view of a disc brake pad according to the invention with the friction material 22 partially cut away to expose the embedded projections 100. In this variation, the brake element 10 comprises a disc brake pad and the backing plate 12 is generally flat. Those skilled in the art will appreciate that all other aspects and principals of the invention as described in the preceding examples are equally applicable to this disc brake application.

FIG. 13 is a sectional view as in FIG. 2 but showing in somewhat exaggerated fashion yet another variation of the invention wherein the projections 100 are normally recessed below the outer surface 24 of the friction material 22, as shown in phantom. Upon the application of sufficient pressure, the friction material 22 compresses to the position shown in solid lines and thus exposes the projection tips 110. In this situation, the tips 110 are recessed below the outer surface 24 of the friction material 22 in the brake relaxed condition, and move toward a generally co-planar, or flush, relation in response to compression of the friction material 22 in the brake applied condition. This is possible due to the friction material 22 having a more readily compressible composition that the tips 110. Thus, the friction material 22 undergoes greater deformation than the projections 110 during movement of the brake element between its brake relaxed and brake applied conditions.

In the process, the friction material is compressed so that the outer surface 24 of the friction material 22 is displaced relative to the tips 110 as the brake element moves toward the brake applied condition. This occurs because the friction material 22 is more readily compressible that the projections 100 such that the friction material 22 undergoes greater deformation (under axial, or normal, stress) than the tips 110 in the course of the brake element 10 moving between the brake relaxed and brake applied conditions. And, in an extreme example, the more highly compressible friction material 22 can be used to advantage when, as in FIG. 13, the tips 110 are recessed slightly below the outer surface 24 of the friction material 22. Here, the tips 110 are able to extend toward a generally co-planar relation (relative to the outer surface 24) in response to the compression forces exerted during the brake applied condition.

The invention of FIGS. 11-13 is particularly effective as a method of applying an emergency (or parking) brake assembly in that friction is generated simultaneously between the engagement surface 28 of the rotating member 30 (drum or rotor) and the combination of the tips 110 and the friction material 22 when the brake element 10 (shoe or pad) is moved to the brake applied condition. In this manner, both the friction material 22 and the projections 100 contribute concurrently to the friction mechanism thereby enhancing braking effectiveness in the brake assembly. In addition, the projections 100 have the ability to roughen the engagement surface 28 of the rotating drum or rotor disc while the friction material 22 forms itself to an optimal shape, thus achieving a high coefficient of friction very quickly. However, in the brake relaxed condition, e.g., FIG. 11-A, the tips 110 do not extend above the outer surface 24 of the friction material 22, and thus do not contact the engagement surface 28 independent of the friction material 22.

In view of the above, it will be seen that the objectives of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method of applying an emergency brake assembly that has never before been used, said method comprising the steps of:

rotating a rotating member having an engagement surface;

providing a non-rotating brake element having a rigid backing plate and a new friction material defining an outer surface, the friction material not ever having been used in any service application;

providing a plurality of rigid, non-biased metallic projections extending directly from the backing plate and embedded within the friction material, each of the embedded projections terminating in a tip proximate the outer surface of the friction material;

positioning the brake element adjacent the rotating member in a brake relaxed condition spaced from the engagement surface;

moving the brake element toward an initial brake applied condition with the outer surface of the friction material in pressing contact with the engagement surface for the first time ever;

and generating friction simultaneously between the engagement surface of the rotating member and the combination of the tips and the outer surface of the friction material when the brake element is moved to the brake applied condition for the first time whereby both the friction material and the embedded projections contribute concurrently to friction generation upon the first ever occurrence of contact of the tips and the outer surface of the friction material with the engagement surface of the rotating member thereby enhancing initial braking effectiveness in the brake assembly.

2. The method of claim 1 wherein said step of generating friction includes compressing the friction material such that the outer surface of the friction material moves relative to the tips in response to moving the brake element toward the brake applied condition.

3. The method of claim 1 wherein said step of generating friction includes moving the tips from a location recessed below the outer surface of the friction material toward a generally co-planar relation in response to moving the brake element from the brake relaxed condition to the brake applied condition.

\* \* \* \* \*